(12) United States Patent
Saito et al.

(10) Patent No.: US 7,306,503 B2
(45) Date of Patent: Dec. 11, 2007

(54) METHOD AND APPARATUS OF FIXING CARBON FIBERS ON A SUBSTRATE USING AN AEROSOL DEPOSITION PROCESS

(75) Inventors: Yasuyuki Saito, Kanagawa (JP); Junri Ishikura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 106 days.

(21) Appl. No.: 10/676,086

(22) Filed: Oct. 2, 2003

(65) Prior Publication Data

US 2004/0077249 A1  Apr. 22, 2004

(30) Foreign Application Priority Data

Oct. 18, 2002  (JP) ............... 2002-304324

(51) Int. Cl.
*H01J 9/00* (2006.01)
*B05B 5/025* (2006.01)

(52) U.S. Cl. ............... 445/50; 445/49; 445/51; 427/483; 427/475; 427/78; 977/890; 977/892

(58) Field of Classification Search ............... 445/60, 445/66, 24, 49–51; 427/446, 562, 577, 450, 427/249.1, 445, 483, 475, 77, 78; 204/192.38, 204/192.05; 423/447.1–447.8; 977/890, 977/892

See application file for complete search history.

(56) References Cited

U.S. PATENT DOCUMENTS 5,424,054 A * 6/1995 Bethune et al. .......... 423/447.2
6,017,259 A * 1/2000 Motoi et al. .................. 445/51
6,383,050 B1 5/2002 Ishikura et al. .............. 445/41
6,497,917 B2 12/2002 Ishikura ....................... 427/9
6,638,403 B1 * 10/2003 Inaba et al. ........... 204/298.41
6,797,336 B2 * 9/2004 Garvey et al. ............. 427/561
2003/0054620 A1 3/2003 Ishikura ..................... 438/584

FOREIGN PATENT DOCUMENTS

| JP | 6-280116 | 10/1994 |
| JP | 00-57934 | 2/2000 |
| JP | 00-86216 | 3/2000 |
| JP | 2000208033 | * 7/2000 |

(Continued)

OTHER PUBLICATIONS

JP 2001-026883A Machine English Translation.*

(Continued)

*Primary Examiner*—Mariceli Santiago
(74) *Attorney, Agent, or Firm*—Fitzpatrick, Cella, Harper & Scinto

(57) ABSTRACT

Evaporation and condensation of carbon is effected by arc discharge between an anode formed of a carbon electrode and a cathode disposed facing the carbon electrode 2 in an inert gas atmosphere, and at the same time, the generated carbon nanotubes are dispersed into an inert gas and transported along with the inert gas through a transporting tube, and a jet of the inert gas containing the carbon nanotubes is emitted from a nozzle, thereby forming carbon nanotubes on a target substrate. This provides a carbon nanotube manufacturing method wherein carbon nanotubes are generated with a simple process, and the CNT patterning process is simplified by forming a carbon nanotube film on a substrate, thereby reducing costs.

4 Claims, 2 Drawing Sheets

FOREIGN PATENT DOCUMENTS

JP          2001-26883          1/2001

OTHER PUBLICATIONS

Patent Abstracts of Japan for JP 2002-255524, published Sep. 2002.
Patent Abstracts of Japan for JP 2001-026883, published Jan. 2001.
Patent Abstracts of Japan for JP 2002-212837, published Jul. 2002.
Patent Abstracts of Japan for JP 2000-208033, published Jul. 2002.

Honma, et al.; "Effect of Catalysts on Carbon, Nanotube Growth on Silicon Substrates in Chemical Vapor Deposition"; J. Surface Soc. of Japan; vol. 25, No. 6, 339-344 (2004).

Kato et al.; "Ultra Fine Particles, Chemistry and Functions;" Modern Applied Chemistry, Series 4, Aaskura Shoten (1993).

T. Wang; "Light Scattering Study on Single Wall Carbon Nanotube Dispersions"; a Thesis, published Apr. 12, 2004 by Georgia Inst. Tech.

* cited by examiner

METHOD AND APPARATUS OF FIXING CARBON FIBERS ON A SUBSTRATE USING AN AEROSOL DEPOSITION PROCESS

BACKGROUND OF THE INVENTION

1. Field of the Invention

The present invention relates to a method and apparatus for continuously generating and forming carbon fiber (fibrous carbon) such as carbon nanotubes, graphite nanotubes, or the like.

2. Description of the Related Art

A carbon nanotube, which is a type of carbon fiber, is a material in the shape of a tube having a configuration wherein graphite structures are wound in the shape of a cylinder, and is a new material which is expected to be applied to various fields due to unique properties thereof. FIG. 2 illustrates a conventional method for generating carbon nanotubes employing the arc method disclosed in Japanese Patent Laid-Open No. 6-280116. As shown in FIG. 2, DC arc discharge in an inert gas with a carbon material, such as graphite or the like, being used as an anode 2, and a heat-resisting electroconductive material being used as a cathode 3, causes evaporation of the carbon material on the side of the anode 2 that reaches high temperature. Generally half of the evaporated carbon condenses in the gas phase, and soot, carbon nanotubes, and the like, are formed on the inner wall of the container. The other half of the evaporated carbon directly condenses at the tip of the cathode 3, and a hard carbonaceous deposited substance 16 is formed. Conventionally, the deposited substance 16 formed on the inner wall of the container and the tip of the cathode 3 is collected to manufacture carbon nanotubes. In FIG. 2, reference numeral 4 denotes an inert gas introducing port for introducing an inert gas into the container, and reference numeral 8 denotes a current supplying device for applying a voltage between the anode 2 and the cathode 3 so as to cause arc discharge.

The carbon nanotubes obtained with the above-described conventional arc discharge method are deposited on the inner wall of the container (the cathode 3). Accordingly, a collecting method is required, thus leading to an increase of process steps. Furthermore, with the conventional arc discharge method, since deposition of the carbon material occurs on the cathode 3, there is a need to perform arc discharge while adjusting the distance between the anode 2 and the cathode 3 corresponding to the deposition amount of the cathode deposited substance 16. Accordingly, the distance between the anode 2 and the cathode 3 cannot be fixed to be constant due to the growth of the cathode deposited substance 16, resulting in unstable discharge. Furthermore, the yield of the carbon nanotubes is low due to the generated cathode deposited substance 16 being exposed to arc discharge for a long time. Furthermore, while carbon nanotubes are contained in the deposited substance 16 generated by the arc discharge or the like, the generated carbon nanotubes tends to be aggregated (coagulated). Accordingly, in the event that carbon nanotubes are to be formed into a film on a substrate, there is a need to perform dispersion processing.

Furthermore, among methods for forming a film of carbon fibers such as carbon nanotubes on a substrate, a method is disclosed in Japanese Patent Laid-Open No. 2000-086216, whereby a catalytic metal film is formed, and is patterned so that the catalysis occurs at desired positions, and carbon nanotubes are formed by performing thermal processing by the CVD method, with the catalytic metal as a nucleus. Additionally another method is disclosed in Japanese Patent Laid-Open No. 2000-057934, whereby an auxiliary agent is applied to the substrate, and carbon nanotubes are formed at desired positions on the substrate by performing thermal processing with the electric field application plasma CVD method. However, with any of these methods, the number of process steps is great, leading to high costs.

With the conventional manufacturing methods, in a case of manufacturing carbon fibers such as carbon nanotubes or the like by the arc discharge method, for example, the carbon fiber is deposited on the inner wall, cathode, and the like, in the arc discharge container, and the deposited substance is collected for manufacturing a carbon material containing carbon fiber. As a result, the carbon fibers cannot be continuously manufactured, leading to an increase of process steps. Furthermore, the deposited substance containing carbon fibers formed on the inner wall of the container or the cathode tends to be aggregated (coagulated). Consequently, there was a need to perform dispersion processing.

Examples of the methods for forming a film of carbon fibers on a substrate include a method whereby dot-shaped patterning of a catalytic metal is performed at desired positions using resist so as to form a catalyst at desired positions for forming carbon fibers such as carbon nanotubes by performing thermal processing by the CVD method, with the catalytic metal as a nucleus, and a method wherein an auxiliary agent (catalysis) is applied to the substrate, and carbon fibers such as carbon nanotubes are formed at desired positions on the substrate with the electric field application plasma CVD method. However, any of these methods has a great number of process steps, leading to high costs.

SUMMARY OF THE INVENTION

The present invention has been made in order to solve the above-described problems, and it is an object thereof to provide a method for continuously forming carbon fibers on a desired substrate. Furthermore, it is an object of the present invention to provide a carbon fiber manufacturing method with fewer process steps and lower manufacturing costs.

According to the present invention, aerosol carbon fiber is directly formed in a transporting gas from the carbon fiber generated by arc discharge for transporting to a carbon nanofiber film-forming chamber, whereby carbon nanofiber is fixed on a substrate.

That is to say, with a manufacturing method for a substrate fixed with carbon fiber according to the present invention, processing is performed with an apparatus including a first chamber having an anode containing carbon and a cathode, disposed facing one another, and a second chamber communicating with the first chamber through a transporting tube. The manufacturing process comprises a setting the pressure in the second chamber to be lower than the pressure in the first chamber, generating arc discharge between the anode and the cathode to form carbon fiber, and ejecting the carbon fiber generated in the first chamber from the end of the transporting tube disposed within the second chamber so that the carbon fiber collides with the substrate using the pressure difference between the first chamber and the second chamber.

Furthermore, by employing a manufacturing method for an electronic device comprising an electrode having carbon fiber according to the present invention, processing is performed with an apparatus including a first chamber having an anode containing carbon and a cathode, disposed facing one another, and a second chamber, in which a substrate having electrodes is disposed, and communicating to the first chamber through a transporting tube. The manufacturing process comprises a step whereby the pressure in the second chamber is set to be lower than the pressure in the first chamber, a step for forming carbon fiber by generating arc discharge between the anode and the cathode, and a step for ejecting or discharging carbon fiber generated in the first chamber is emitted from the end of the transporting tube disposed within the second chamber so that the carbon fiber collides with the electrodes on the substrate using the pressure difference between the first chamber and the second chamber.

With the above-described manufacturing methods, a non-oxidative gas is preferably supplied into the first chamber. Furthermore, the above-described anode preferably contains a catalytic material. Here, for example, the above-described electronic device comprises an electron-emitting device.

Furthermore, by employing a manufacturing method for a display having multiple electron-emitting devices according to the present invention, the aforementioned electron-emitting devices are manufactured.

Furthermore, a deposition apparatus for carbon fiber according to the present invention comprises a first chamber, a transporting tube, a second chamber communicated to the first chamber through the transporting tube, an anode containing carbon disposed within the first chamber, a cathode disposed within the first chamber, facing the anode containing carbon, and pressure control means for keeping the pressure in the first chamber greater than the pressure in the second chamber.

Furthermore, with a deposition apparatus for carbon fiber according to the present invention, evaporation and condensation of carbon are effected by arc discharge between an anode formed of a carbon electrode and a cathode disposed facing the anode formed of the carbon electrode in an inert gas atmosphere to generate carbon fiber. At the same time, the generated carbon fiber is dispersed into an inert gas, and is transported along with the inert gas so as to be emitted as a jet from a nozzle, whereby carbon fiber is formed on a substrate.

The above-described deposition apparatus for a film containing carbon fiber comprises a transporting tube, a carbon fiber-generating chamber including an anode formed of a carbon material, a cathode disposed with a predetermined distance to the anode for causing arc discharge between the anode and the cathode so as to heat and evaporate the carbon material, a suction opening of the transporting tube disposed above the evaporation source, and an inert gas introducing unit. The inert gas introducing unit comprises a carbon fiber film-forming chamber including a nozzle connected to the end of the transporting tube, a substrate disposed facing the nozzle, and an inert gas exhaust unit, wherein carbon nanofiber generated by heating and evaporating the evaporation source is transported along with the inert gas due to the pressure difference between the carbon fiber-generating chamber and the carbon fiber film-forming chamber through the transporting tube so as to be emitted as a jet from the nozzle, whereby a carbon fiber film or a lump containing carbon fiber is formed on the substrate.

Furthermore, according to the present invention comprising a deposition method for a film containing carbon fiber, evaporation and condensation of carbon are effected by arc discharge between an anode formed of a carbon electrode and a cathode disposed facing the anode formed of the carbon electrode in an inert gas atmosphere so as to generate carbon fiber. At the same time, the generated carbon fiber is dispersed into an inert gas, and is transported along with the inert gas so as to be emitted as a jet from a nozzle, whereby a film containing carbon fiber is formed on an object.

The above-described deposition method for a film containing carbon fiber uses a transporting tube, a carbon fiber-generating chamber including an anode formed of a carbon material, a cathode disposed with a predetermined distance to the anode for causing arc discharge between the anode and the cathode so as to heat and evaporate the carbon material, a suction opening of the transporting tube disposed above the evaporation source, and an inert gas introducing unit, a carbon fiber film-forming chamber including, a nozzle connected to the end of the transporting tube, a substrate disposed facing the nozzle, and an inert gas exhaust unit, wherein carbon nanofiber generated by heating and evaporating the evaporation source is transported along with the inert gas due to the pressure difference between the carbon fiber-generating chamber and the carbon fiber film-forming chamber through the transporting tube so as to be emitted as a jet from the nozzle, so that a carbon fiber film or a lump containing carbon fiber is formed on the substrate, whereby a film containing carbon fiber is formed on the subject.

Further objects, features and advantages of the present invention will become apparent from the following description of the preferred embodiments with reference to the attached drawings.

DESCRIPTION OF THE PREFERRED EMBODIMENTS

A preferred embodiment of the present invention, comprises performing arc discharge between an anode formed of a carbon electrode and a cathode disposed facing aforementioned carbon electrode in an inert gas for effecting evaporation and condensation of carbon to generate carbon nanotubes. At the same time, the generated carbon nanotubes are dispersed into an inert gas, transported along with the inert gas, and ejected as a jet of the carbon nanotubes and the inert gas from a nozzle, whereby the carbon nanotubes are formed on an object in the shape of a film.

The carbon material or the like is evaporated by the arc discharge method by heating, and the carbon nanotubes generated from the heating and evaporation of the carbon are transported along with the inert gas, through a transporting tube using the pressure difference between a carbon nanotube generating chamber and a carbon nanotube film-forming chamber, and the jet of the carbon nanotubes and the inert gas is emitted from the nozzle, whereby a carbon nanotube film or a lump containing carbon nanotubes is formed on a substrate.

A carbon fiber generating/film-forming apparatus according to an embodiment of the present invention will be described with reference to FIG. 1. Note that the size, material, and relative layout, of the components thereof described in the present embodiment are not restricted to those described in the present embodiment, unless specifically described otherwise.

The present invention is not restricted to any single method for forming carbon nanotubes, but rather, the present invention can be applied to methods for forming any carbon fiber with the shape of a tube, formed of carbon as a principal component using the arc discharge method. Examples of carbon fibers include, but are not limited to, the aforementioned carbon nanotube, a graphite nanofiber wherein graphen layers are built up in the longitudinal direction of the fiber (the c axis is not orthogonal to the axis of the fiber (longitudinal direction)), a helical carbon fiber, twist carbon fiber, a cup-stacked carbon fiber wherein graphite layers in the shape of a cup are built up in the longitudinal direction of the fiber, and the like.

A sheet of graphite is referred to as "graphen" or "graphen sheet". A graphite structure is formed of carbon atoms disposed in the shape of a hexagon with covalently bonded due to $SP^2$ hybrid, ideally with a distance of $3.354 \times 10^{-10}$ m between each other. Note that one sheet in the graphite structure is referred to as "graphen" or "graphen sheet".

Figure 1:
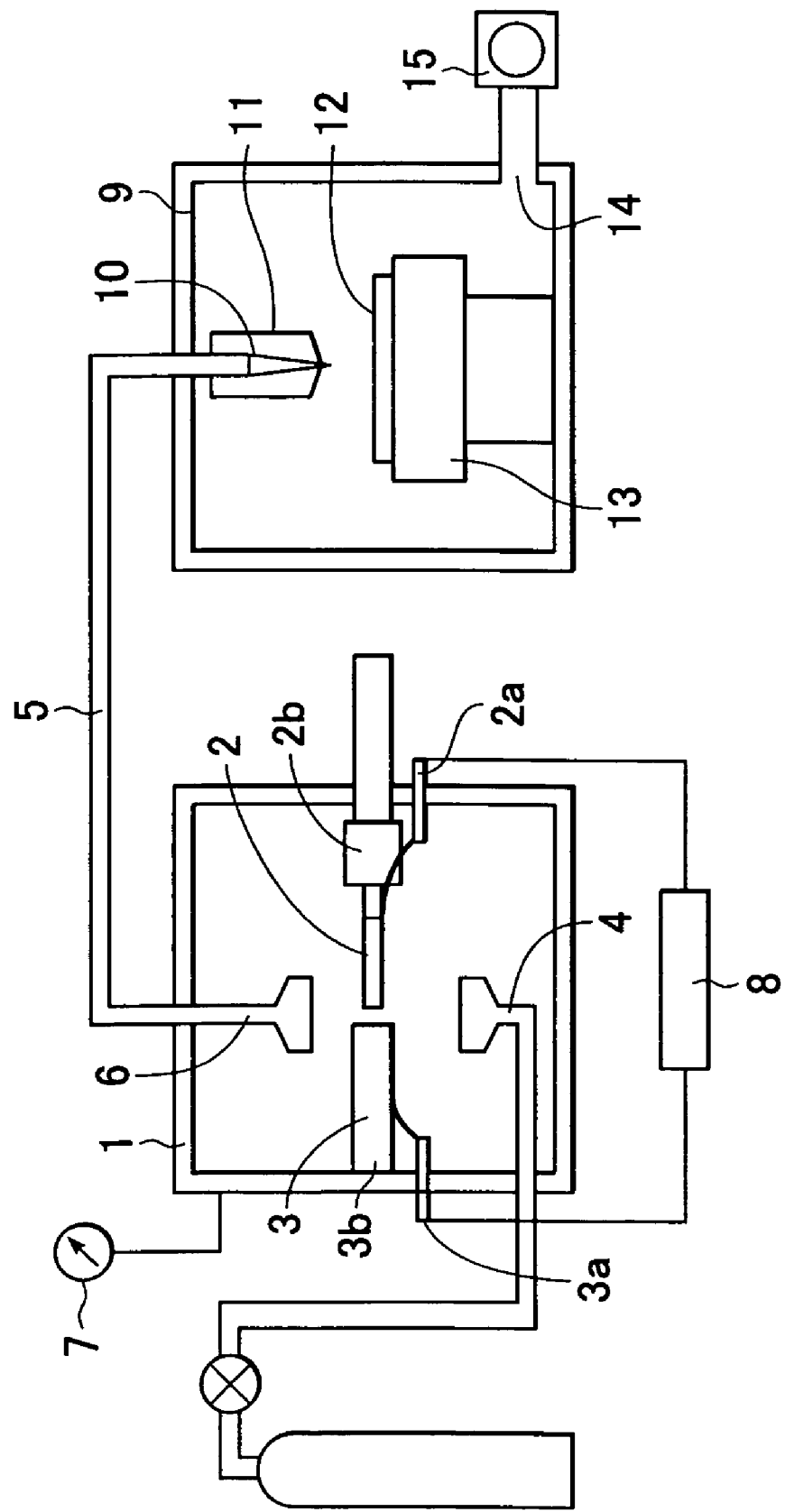
FIG. 1 is a configuration diagram of a carbon nanotube generating/film-forming apparatus according to a first embodiment of the present invention.
Figure 2:
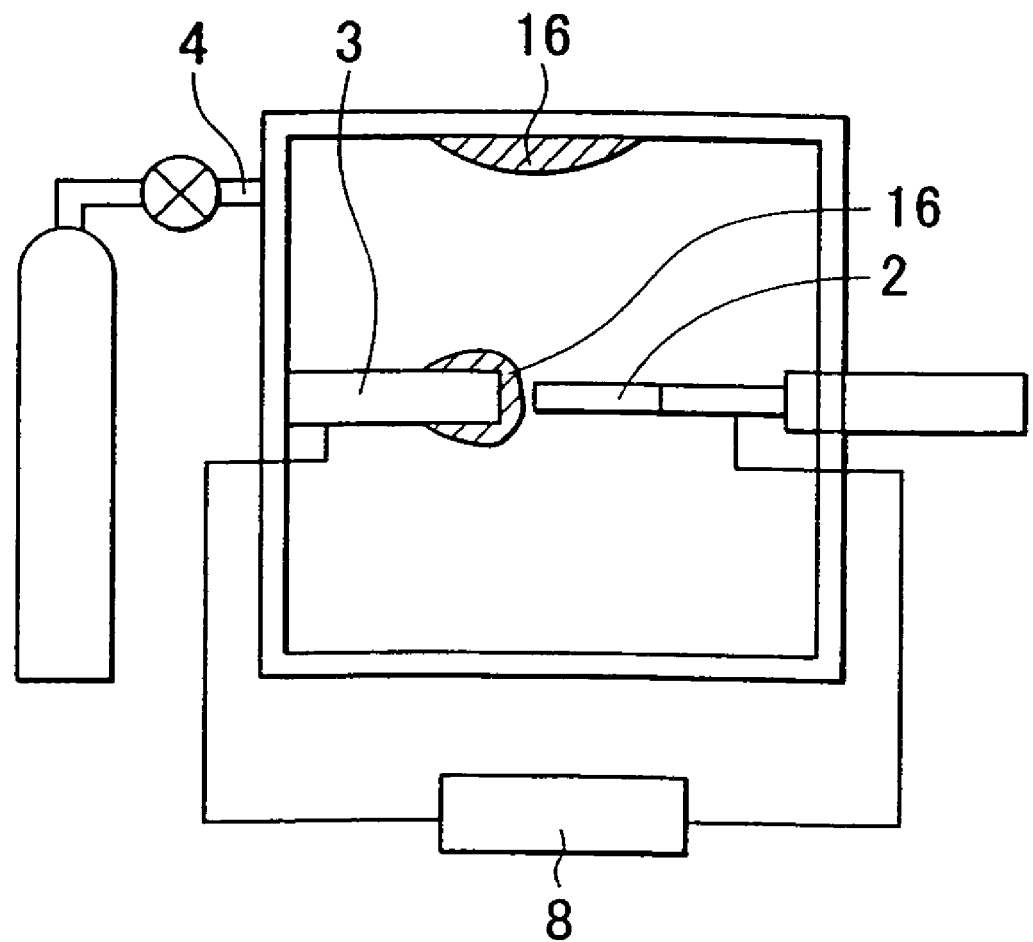
FIG. 2 is a configuration diagram of a conventional carbon nanotube manufacturing apparatus.

FIG. 1 is a schematic diagram which illustrates a carbon nanotube generating/film-forming apparatus according to an embodiment of the present invention. In FIG. 1, an anode 2 formed of a carbon material such as graphite or the like, and a cathode 3, are disposed in the carbon nanotube generating chamber 1. While the anode 2 can be formed of a carbon material such as graphite or the like, an arrangement may be made wherein catalyst such as Fe, Ni, Pd, or the like, which accelerates the growth of carbon nanotubes, is mixed into the carbon material. As a catalyst which accelerates the growth of carbon nanotubes, irons, platinums, rare-earth metals, iron/rare-earth metal mixture, and the like, are employed. Examples of cathode material include carbon, graphite, copper, and the like. As for the combination of the anode 2 and the cathode 3, carbon is preferably employed for both the anode 2 and the cathode 3. Furthermore, an arrangement may be made wherein the carbon nanotube generating chamber has multiple anodes 2 for stable discharge. The anode 2 is connected to a current input terminal 2a, and the cathode 3 is connected to a current input terminal 3a, as well. Furthermore, the anode 2 can be moved by a linear-movement/rotation mechanism 2b which enables linear movement and rotation of the anode 2. The linear movement is performed in the horizontal direction in the drawing, and rotation is performed with the center of the electrode rod forming the anode 2 as the axis. Furthermore, the cathode 3 can be moved by the linear-movement mechanism 3b which enables linear movement of the cathode 3. The linear movement is performed in the horizontal direction in FIG. 1. While the linear-movement/rotation mechanism 2b and the movement mechanism 3b are preferred, the linear-movement/rotation mechanism 2b and the linear-movement mechanism 3b are more preferred for stable discharge.

Furthermore, the carbon nanotube generating chamber 1 includes an introducing port 4 for introducing an inert gas so as to adjust the atmosphere in the carbon nanotube generating chamber 1, and for forming the generated carbon nanotubes into aerosol, and further includes a transporting port 6 connected to a transporting tube 5 for transporting aerosol carbon nanotubes along with the inert gas. Examples of inert gases employed in the present invention include, but are not limited to, a helium gas, an argon gas, a nitrogen gas, a nitrogen-hydrogen mixture gas.

In FIG. 1, reference numeral 7 denotes a pressure gauge, and reference numeral 8 denotes a electric power supplying device for supplying electric power for causing arc discharge between the anode 2 and the cathode 3. The transporting tube 5 connected to the transporting port 6 is introduced into a carbon nanotube film-forming chamber 9, and is connected to a nozzle 10 at the end thereof. Furthermore, the nozzle 10 includes a heating mechanism 11. The carbon nanotube film-forming chamber 9 includes a substrate 12 for forming a carbon nanotube film, a stage 13 for moving the substrate 12, and an exhaust port 14 for exhausting the inert gas within the carbon nanotube film-forming chamber 9. The exhaust port 14 is connected to a vacuum pump 15.

Next, a carbon nanotube generating and film-forming method will be described using the above-described generating/film-forming apparatus. First of all, the pressure is adjusted to $10^{-2}$ Pa or less in the carbon nanotube generating chamber 1, transporting tube 5, and carbon nanotube film-forming chamber 9. Next, an inert gas is introduced into the carbon nanotube generating chamber 1 through the inert gas introducing port 4 while evacuating the carbon nanotube film-forming chamber 9 by the vacuum pump 15 so that the pressure in the carbon nanotube generating chamber 1 is, but not limited to, around 70 kPa. The pressure of the carbon nanotube generating chamber 1 is preferably set to a pressure suitable for forming carbon nanotubes or the like, and the pressure is selected taking the pressure difference between the carbon nanotube generating chamber 1 and the carbon nanotube film-forming chamber 9. In the present invention, the pressure in the carbon nanotube film-forming chamber 9 is preferably set to a few hundred Pa or less. The stable flow of the inert gas is preferably formed from the pressure difference between the carbon nanotube generating chamber 1 and the carbon nanotube film-forming chamber 9. Subsequently, a DC voltage is applied from the electric power supplying device 8 with the anode connected to positive terminal thereof, and the cathode connected to negative terminal thereof, causing arc discharge between the anode 2 and the cathode 3. As a result, evaporation of the carbon material of the anode 2 is effected, resulting in condensation and recrystallization of the evaporated carbon material, thereby generating carbon nanotubes. After confirming stable discharge, the anode 2 and the cathode 3 are moved by the linear-movement/rotation mechanism 2b and the linear-movement mechanism 3b so as to keep the distance between the anode 2 and the cathode 3 constant during discharge.

The generated carbon nanotubes are dispersed into the inert gas, forming aerosol carbon nanotubes. The inert gas containing carbon nanotubes is transported to the carbon nanotube film-forming chamber 9 through the transporting tube 5 as an inert gas flow resulting from the pressure difference between the carbon nanotube generating chamber 1 and the carbon nanotube film-forming chamber 9. The inert gas containing carbon nanotubes transported to the carbon nanotube film-forming chamber 9 is ejected as a jet at high speed from the nozzle 10 mounted to the end of the transporting tube 5 to the substrate 12, forming a carbon nanotube film on the substrate 12. At this time, the transporting tube 5, the nozzle 10, and the substrate 12, are preferably heated. The jet of the inert gas containing carbon nanotubes is preferably emitted at a speed (m/S) with magnitude of ten or faster.

Furthermore, an electrode disposed on the surface of the substrate where carbon fiber collides fixes the carbon fiber on the electrode, resulting in supplying electrons to the carbon nanotubes. Thus, the present method can be applied to various kinds of electronic devices such as an electron-emitting device, transistor, or the like. In particular, an electron source where a large number of electron-emitting devices are two-dimensionally arrayed can be formed by forming an array of a large number of electrodes where carbon fiber has been fixed on the substrate. Furthermore, a display can be formed by forming an array of anode electrodes having a luminous substance such as a fluorescent substance or the like so that the carbon fiber faces an fixed electrode, as well.

Examples according to the present invention will be presented below, but the present invention is not limited to these examples.

First Embodiment

A carbon nanotube generating/film-forming apparatus and a manufacturing method according to a first embodiment of the present invention will be described with reference to FIG. 1. A graphite electrode with the diameter of 10 mm was employed for the cathode 3, a carbon electrode with the diameter of 10 mm and the length 10 cm, containing Ni of 20% by weight was employed for the anode 2, and the distance between these electrodes was set to 1 mm. First, the carbon nanotube generating chamber 1, the transporting tube 5, and the carbon nanotube film-forming chamber 9, were evacuated so that the pressure thereof reached $10^{-2}$ Pa or less. Subsequently, a helium gas was supplied into the carbon nanotube generating chamber 1 through the inert gas introducing port 4, whereby the pressure in the carbon nanotube generating chamber 1 was adjusted to be around 70 kPa. At this time, the carbon nanotube film-forming chamber 9 was evacuated by the vacuum pump 15, whereby the pressure in the carbon nanotube film-forming chamber 9 was adjusted to be 200 Pa. The pressure difference was created between the carbon nanotube generating chamber 1 and the carbon nanotube film-forming camber 9, and the supply of a helium gas was adjusted for a stable flow of the helium gas from the carbon nanotube generating chamber 1 to the carbon nanotube film-forming chamber 9 through the transporting tube 5.

Next, a DC voltage was applied from the electric supplying device 8 with the anode connected to the positive terminal and the cathode connected to the negative terminal causing arc discharge between the anode 2 and the cathode 3, and the DC voltage was adjusted so that a discharge current was to be 50 A, whereby stable discharge was obtained. After confirming stable discharge, the anode 2 and the cathode 3 were moved by the linear-movement/rotation mechanism 2b and the linear-movement mechanism 3b, and the distance between the anode 2 and the cathode 3 was controlled so as to be constant during discharge. Evaporation of the carbon material of the anode 2 was effected due to the arc discharge, and condensation and recrystallization of the evaporated carbon material occurred, forming carbon nanotubes.

The carbon nanotubes generated in the carbon nanotube generating chamber 1 were dispersed into a helium gas, forming aerosol carbon nanotubes. The helium gas containing carbon nanotubes were transported to the carbon nanotube film-forming chamber 9 through the transporting tube 5 as a gas flow. The helium gas containing carbon nanotubes transported to the carbon nanotube film-forming chamber 9 was emitted as a jet at a high speed to the substrate 12 from the nozzle 10 mounted to the end of the transporting tube 5, whereby a carbon nanotube film was formed on the substrate 12. At this time, the transporting tube 5 was heated at 200° C., the nozzle 10 was heated at 300° C., and the substrate 12 was heated at 150° C. The jet of the helium gas containing carbon nanotubes was emitted at 50 m/s or more. The nozzle 10 was fixed, and accordingly, a carbon nanotube film was formed in the shape of a line by scanning the substrate 12 which was moved at 0.1 mm/s, with the stage 13.

The carbon nanotube film was formed in these conditions: the nozzle diameter of 1 mm, Al substrate heated at 150° C., the pressure in the carbon nanotube generating chamber of 70 kPa, the He gas flow of 10 L/min, and the pressure in the carbon nanotube film-forming chamber of 200 Pa.

In the present embodiment, carbon nanotubes can be continuously generated by arc discharge, and the generated carbon nanotubes can be directly transported, forming on a substrate. Accordingly, it becomes unnecessary to collect the carbon nanotubes, and to perform dispersion processing, thereby reducing process steps.

Second Embodiment

A carbon nanotube generating/film-forming apparatus and a manufacturing method according to a second embodiment of the present invention will be described with reference to FIG. 1. A graphite electrode with the diameter of 10 mm was employed for the electrode 3, a carbon electrode with the diameter of 10 mm and the length 10 cm, containing a Ni-Co alloy core was employed for the anode 2, and the distance between these electrodes was set to 1 mm. First, the carbon nanotube generating chamber 1, the transporting tube 5, and the carbon nanotube film-forming chamber 9, were evacuated so that the pressure thereof reached $10^{-2}$ Pa or less. Subsequently, a helium gas was supplied into the carbon nanotube generating chamber 1 through the inert gas introducing port 4, whereby the pressure in the carbon nanotube generating chamber 1 was adjusted to around 70 kPa. At this time, the carbon nanotube film-forming chamber 9 was evacuated by the vacuum pump 15, whereby the pressure in the carbon nanotube film-forming chamber 9 was adjusted to 200 Pa. The pressure difference was created between the carbon nanotube generating chamber 1 and the carbon nanotube film-forming camber 9, and the supply of a helium gas was adjusted for a stable flow of the helium gas from the carbon nanotube generating chamber 1 to the carbon nanotube film-forming chamber 9 through the transporting tube 5.

Next, a DC voltage was applied from the electric supplying device 8 with the anode connected to the positive terminal and the cathode connected to the negative terminal causing arc discharge between the anode 2 and the cathode 3. The DC voltage was adjusted so that a discharge current was to be 50 A, whereby stable discharge was obtained. After confirming stable discharge, the anode 2 and the cathode 3 were moved by the linear-movement/rotation mechanism 2b and the linear-movement mechanism 3b, and the distance between the anode 2 and the cathode 3 was controlled so as to be constant during discharge. Evaporation of the carbon material of the anode 2 was effected due to the arc discharge, resulting in condensation and recrystallization of the evaporated carbon material occurred, forming carbon nanotubes.

The carbon nanotubes generated in the carbon nanotube generating chamber 1 were dispersed into a helium gas, whereby aerosol carbon nanotubes were formed. The helium gas containing carbon nanotubes were transported to the carbon nanotube film-forming chamber 9 through the transporting tube 5 as a gas flow. The helium gas containing carbon nanotubes transported to the carbon nanotube film-forming chamber 9 was emitted as a jet at a high speed to the substrate 12 from the nozzle 10 mounted to the end of the transporting tube 5, whereby a carbon nanotube film was formed on the substrate 12. At this time, the transporting tube 5 was heated at 200° C., the nozzle 10 was heated at 300° C., and the substrate 12 was heated at 150° C. The jet of the helium gas containing carbon nanotubes was emitted at 50 m/s or faster. The nozzle 10 was fixed, and accordingly, a carbon nanotube film was formed in the shape of a line by scanning the substrate 12 which was moved at 0.1 mm/s, with the stage 13.

Note that the carbon nanotube film was formed with a nozzle diameter of 1 mm, the Al substrate heated at 150° C., the pressure in the carbon nanotube generating chamber of 70 kPa, the He gas flow of 10 L/min, and the pressure in the carbon nanotube film-forming chamber of 200 Pa.

According to the present invention, carbon fiber can be continuously generated by arc discharge, and the generated carbon fiber can be directly transported, forming on a substrate. Accordingly, there is no need to collect the carbon fiber, and to perform dispersion processing or the like, thereby reducing process steps and manufacturing costs. Furthermore, the method according to the present invention enables carbon nanotubes to be continuously manufactured, and thus has remarkable industrial advantages.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for manufacturing a substrate including carbon fibers thereon comprising:
    (a) a first chamber for generating carbon fibers having disposed therein an anode containing carbon and a cathode facing said anode;
    (b) a second chamber containing a stage on which the substrate is located;
    (c) a unit for forming an aerosol of said generated carbon fibers;
    (d) a transporting tube connecting said first and second chambers for transporting said aerosol from said first chamber to said second chamber;
    (e) a nozzle facing the substrate disposed at an end of the transporting tube; and
    (f) pressure control means for providing a pressure in said first chamber greater than a pressure in said second chamber for conducting said aerosol through said transporting tube and ejecting the aerosol from the nozzle at 50 m/s or more.

2. The apparatus according to claim 1, wherein said nozzle includes a heater for heating said nozzle.

3. The apparatus according to claim 1, wherein said unit for forming said aerosol is an inert gas introducing unit for introducing an inert gas to said first chamber.

4. The apparatus according to claim 1, further comprising a heater for heating the substrate.

* * * * *